INVENTOR.
George R. Scott.
BY
Harness, Dickey, Pierce & Hann
ATTORNEYS.

April 11, 1939. G. R. SCOTT 2,153,898
ROTARY TOOL HOLDING FIXTURE
Filed April 29, 1936 2 Sheets-Sheet 2

INVENTOR.
George R. Scott.
BY
Harness, Dickey, Pierce & Kraus
ATTORNEYS.

Patented Apr. 11, 1939

2,153,898

UNITED STATES PATENT OFFICE 2,153,898

ROTARY TOOL HOLDING FIXTURE

George R. Scott, Detroit, Mich.

Application April 29, 1936, Serial No. 76,944

6 Claims. (Cl. 29—105)

This invention relates to a rotary tool holding fixture primarily designed for holding tools utilized for machining globoidal type worms.

In order to maintain a more complete understanding of the present invention, reference may be had to applicant's copending application, Serial No. 572,527, filed November 2, 1931, relating to a tool holding fixture utilized for substantially the same purpose as the tool holding fixture of the present invention. The present application is a continuation in part of applicant's abovementioned prior co-pending application insofar as the features of the invention are common to both cases.

It has been found essential in apparatus for machining worms of this type that the cutting edge of the tool be maintained at all times in a plane tangential to a predetermined base circle. It is also essential that the cutting edge of the tool lie in a horizontal plane passing through the axis of rotation of the worm being machined. It is therefore essential that simple and accurate means be provided for the adjustment of the tool in the fixture in which it is mounted in order that the cutting edge may be positioned accurately upon this predetermined line. Further, it will be appreciated that the cutting edge of the tool will be displaced substantially, every time the tool is sharpened and accurate adjustment is therefore necessary to readjust the tool to predetermined position after sharpening.

It is an object of the present invention to provide means for mounting a cutting tool for machining globoidal worms, which means not only includes simple and effective apparatus for positioning the cutting edge of the tool in a predetermined line, but which also permits of accurate angular adjustment of the tool in order to regulate the amount of relief between the cutting tool and the tooth surface being machined.

It has long been appreciated that the angle of relief between one face of the tool and the tooth surface which it engages is a critical factor in determining the efficiency of the cutting obtained. In order to provide a tool holding fixture which may satisfactorily be used for machining various worms of different pitches, it is virtually essential that some simple and effective means be provided for adjusting the angle of the tool with respect to the tooth face against which the cutting edge is disposed.

The present application contemplates the provision of a tool holding fixture which has a plurality of turrets mounted thereon. These turrets are each individually positioned in order that they may be adjusted so that the tool held in the turret is positioned tangential to a predetermined desired base circle. The turrets each include a tool holding element rotatably mounted therein on an axis parallel to the cutting edge of the tool in order that simple and effective means may be provided for adjusting the angle of relief of the tool with respect to the tooth surface which it engages. The tool holding element within the turret includes means for positioning the tool in order that the cutting edge thereof will lie in a plane passing through the axis of rotation of the work.

Many other and further objects and advantages of the invention will become clearly apparent from the following specification when considered in connection with the accompanying drawings forming a part thereof.

Figure 1:
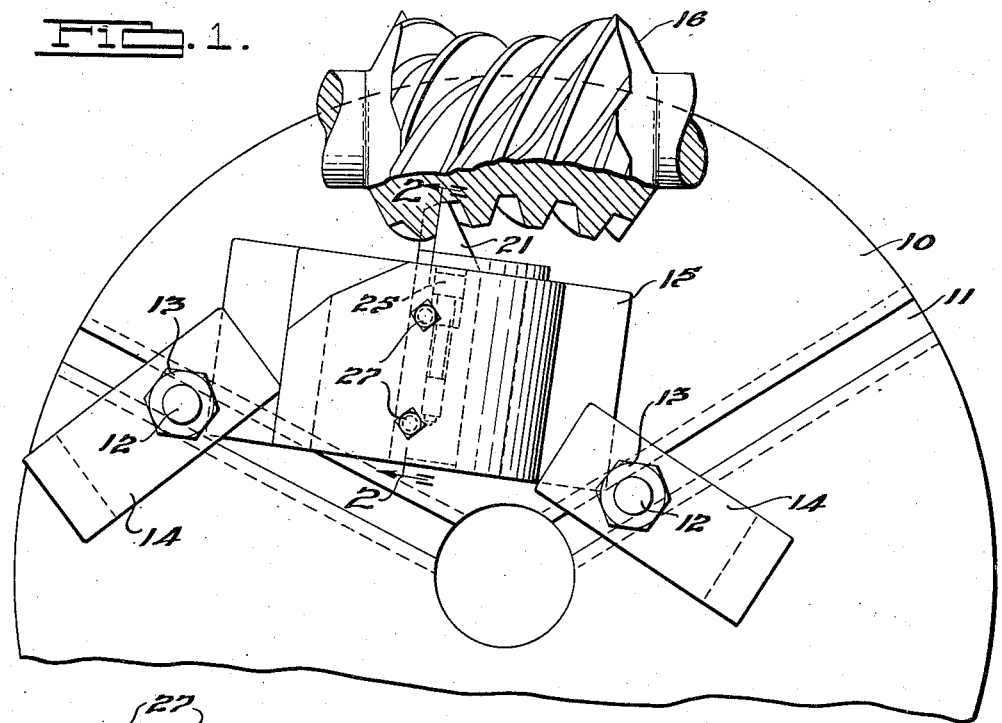
Figure 1 is a fragmentary plan view diagrammatically illustrating a portion of the improved tool holding fixture, showing one turret thereof and the manner in which the turret is mounted on the fixture.

With more particular reference to the drawings, the specific embodiment of the invention disclosed includes a rotary tool supporting table 10 having a plurality of radially disposed slots 11 therein. The slots 11 are preferably sufficiently undercut to receive the heads of bolts 12 and it is preferable to form the slots 11 of such cross sectional configuration that the bolts 12 may be moved radially therealong and positioned any desired distance from the axis of rotation of the rotary support 10. The bolts 12 are each provided with nuts 13 which serve to engage the upper surface of clamps 14 through which the bolts 12 pass and, as is clearly seen in Figs. 1 and 3, these clamps serve to accurately position a removably mounted turret 15 upon the upper surface of the rotary work table 10.

As is conventional in constructions of this general character, the rotary table 10 is driven from a suitable source of power and by means of mechanism conventional in the art, a roughed-out worm blank 16 is synchronously driven with respect to the rotary table, the relative rotation of these two members being controlled in strict accordance with the ratio between the worm to be cut and the worm wheel with which the worm is intended to mesh.

The turret 15 has a cylindrical transverse bore 18 extending therethrough, and the turret is preferably so positioned that the axis thereof lies in a plane which will pass horizontally through the axis of rotation of the worm 16 to be machined. A cylindrical tool holding member 19 fits snugly within the bore 18 and is provided with an axially extending slot 20 of sufficient width to receive a cutting tool 21. The slot is preferably so formed that one wall thereof lies in a diametral plane passing through the axis of the tool holding member 19 and the upper wall of the slot preferably also lies in a diametral plane intersecting the side wall at right angles at the axis of the tool holding member 19. A pair of cooperating wedges 23 and 24 are disposed in the slot beneath the tool 21 and the wedge 24 preferably has threaded therein a locking screw 25 which, as will be seen by reference to Fig. 2, when tightened, will serve to firmly position the tool in the slot 20 with the cutting edge thereof lying exactly in the axis of the cylindrical tool holding member 19.

It will be apparent that the tool holding member 19, due to its cylindrical configuration, may be adjusted angularly in the bore 18 and may be locked in position by means of a pair of locking screws 27 threaded through the wall of the turret 15 and each provided with suitable lock nuts 28.

As is conventional in constructions of this kind, when the tool 21 is sharpened, the entire upper surface thereof is ground away in order that the cutting edge will lie in the upper surface of the tool. Consequently, after the tool has been sharpened, it may be positioned in the slot 20 and the cutting edge thereof will at all times lie in the axis of the cylindrical tool holding member 19 irrespective of the amount of the tool which has been ground away as the result of repeated sharpening operations. The tool contemplated by the present application is utilized for the purpose of finishing only one side of the tooth structure of the worm and it will be clearly seen by reference to Fig. 1 that the tool holding member 19 may be rotated to a position so that the relief angle at which the tool engages the surface of the tooth to be cut may be adjusted, as may be desired, to obtain maximum efficiency irrespective of the pitch of the worm being operated upon.

Figures 2, 3:
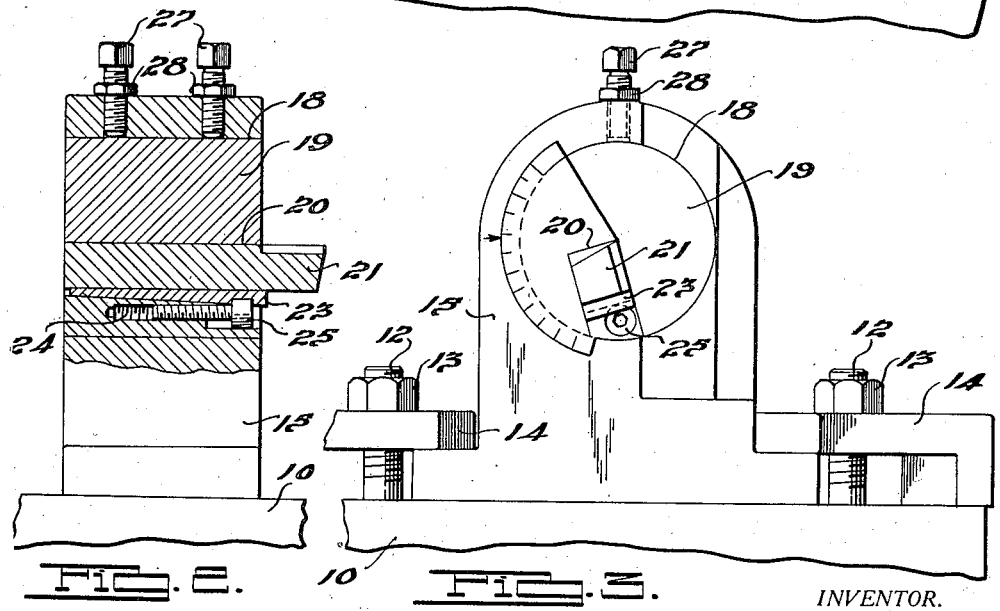
Fig. 2 is a vertical sectional view, with parts in elevation, taken substantially along the line 2—2 of Fig. 1, illustrating the manner in which the tool is mounted and the mechanism for adjusting the vertical position thereof.
Fig. 3 is an elevational view of the turret, illustrating the mechanism for varying the relief angle of the cutting tool.

In the apparatus shown in Figs. 1, 2, and 3 of the drawings, it will be readily appreciated that after the cutting tool 21 has been positioned and used for the purpose of machining one side of the tooth structure of the worm 16, the tool holding member 19 may be rotated to the desired position and the same tool may be utilized for machining the opposite surface of the tooth, and it will be seen that the desired relief angle may be obtained at all times.

Figure 4:
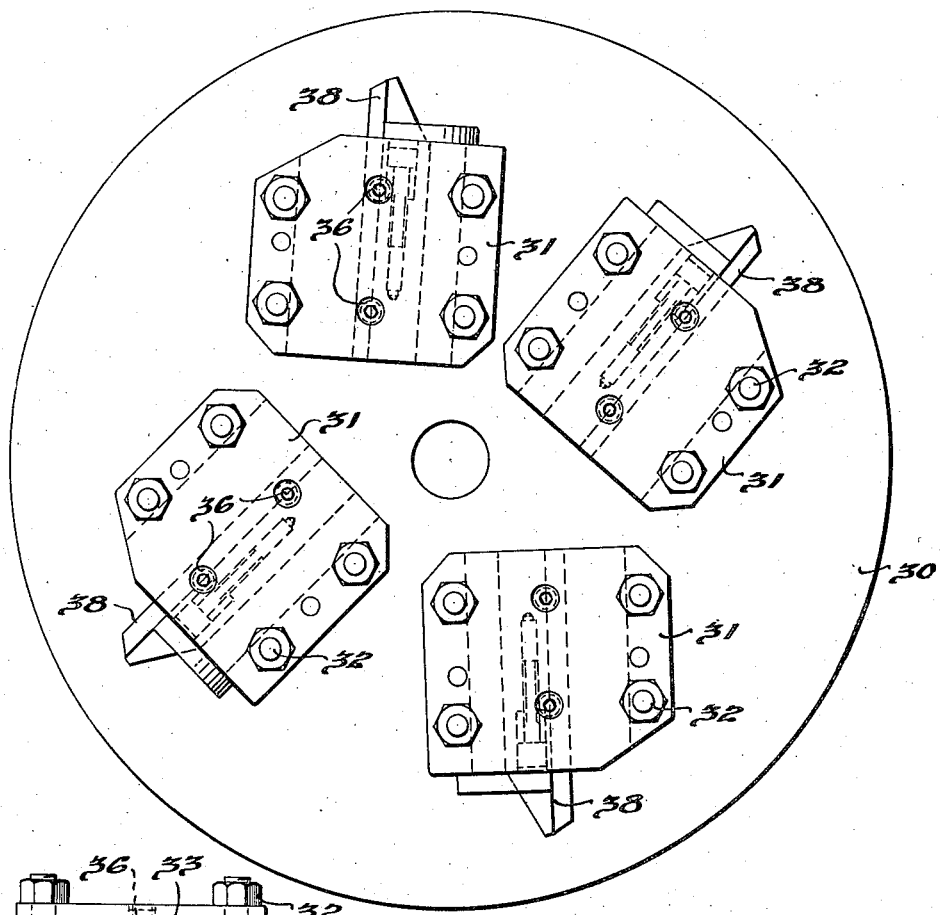
Fig. 4 is a plan view of a modified form of the invention, showing a tool holding fixture having a plurality of tool holding turrets thereon.
Figure 5:
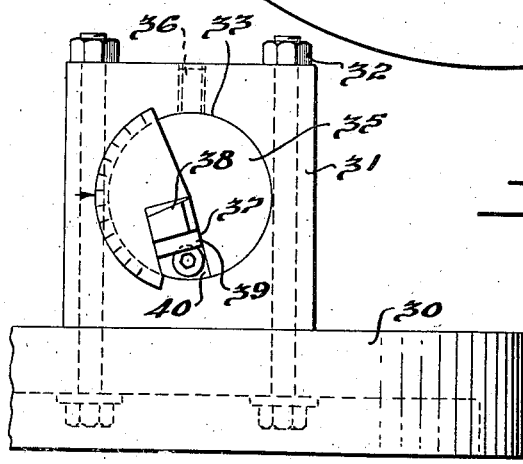
Fig. 5 is an elevational view of one of the turrets, illustrating the manner in which an individual tool is mounted thereon.

In the modified form of the invention shown in Figs. 4 and 5, a tool holding fixture is disclosed which embodies substantially the same general teachings disclosed in Figs. 1 to 3, inclusive. This apparatus includes a rotary table 30 having a plurality of turrets 31 bolted permanently in position thereon by means of suitable vertically extending bolts 32. Each of the turrets has a cylindrical bore 33 extending horizontally therethrough and the turrets are preferably so positioned that the axis of this bore lies tangential to the predetermined desired base circle and at the same time lies in a horizontal plane passing through the axis of the work to be machined. The turrets each include a cylindrical tool holding member 35 snugly fitted within the bore 33 and retained in predetermined angular position by means of suitable set screws 36. The rotary tool holding member 39 has a tool receiving slot 37 therein, one of the side walls of which lies in a plane passing through the axis of the tool holding member and intersecting the top wall of the slot at right angles at this axis. Suitable cutting tools 38 are retained in position in each of the slots by means of cooperating wedges 39 and 40 substantially identical in construction and operation as the wedges 23 and 24 described in connection with the embodiment of the invention shown in Figs. 1 to 3.

It will be appreciated that in this modified form of the invention the turrets may be adjusted in position so that one pair of the tools will serve to machine one side of the tooth structure of the worm and the other pair of tools will serve to machine the opposite side of the tooth structure. In each instance it will be appreciated that the tool holding member 35 may be adjusted to a position in order that the relief angle of the cutting edge of the tool will be positioned at an angle of maximum efficiency with respect to the tooth surface which it engages irrespective of the pitch of the particular worm being machined. This accurate adjustment is obtained by the rotation of the tool holding members in their respective turrets. The turrets 31 are so positioned upon the rotary work table 30 that the tools will occupy substantially the position of individual teeth upon a worm wheel with which the worm is subsequently adapted to mesh. This modified form of the invention makes possible the relatively rapid machining of a worm being treated and makes possible the machining of both sides of the tooth structure thereof in a single operation.

It will be appreciated that the above described embodiments of the invention are merely illustrative of the generic inventive concept presented and that many other and further modifications falling within the scope thereof and defined in the subjoined claims will be apparent to those skilled in the art.

I claim as my invention:

1. A tool holding fixture for machining tooth surfaces on a worm of the globoidal type, comprising a rotary table, a turret mounted on said table, a tool holding element mounted in said turret and adapted for adjustable rotation about an axis tangential to a predetermined base circle, and means for locking a tool in said tool holding member with the cutting edge of said tool lying in the axis thereof.

2. In a rotary tool holding fixture for machining globoidal worms, a rotary table, a turret adjustably mounted upon said table whereby a tool in said turret may be adjusted to a position in which the cutting edge thereof is tangential to a predetermined base circle, and means in said turret for adjustably mounting a tool therein whereby the angle of relief between said cutting tool and the surface of a tooth being machined may be adjusted.

3. Apparatus for finishing gears comprising a tool holding member of generally cylindrical configuration, a cutting tool locked in position in said member, said cutting tool having a cutting edge lying in the axis of said tool holding member, and means for adjustably mounting said tool holding member for rotation about its axis.

4. Apparatus for finishing globoidal worms comprising a supporting turret having a cylindrical bore therethrough, a cylindrical tool holding member rotatable in said bore, means for locking said tool holding member against rotation, a cutting tool carried by said tool holding member, said cutting tool having a straight cutting edge lying in the axis of said bore whereby rotation of said tool holding member will retain the predetermined position of the cutting edge.

5. A tool holding fixture comprising a substantially cylindrical tool holding member having a slot therein, said slot having a bottom wall and a side wall, said bottom wall and side wall intersecting in the axis of said tool holding member, a cutting tool having a shank including intersection surfaces complemental to said bottom and said walls of said slot, said cutting tool having a cutting edge lying in the line of intersection of said surfaces whereby when said tool is seated in said slot the cutting edge thereof will be in the axis of said tool holding member.

6. A tool holding fixture for machining tooth surfaces of a worm of the globoidal type, comprising a rotary table, a turret mounted on said table, said turret having a cylindrical bore therethrough, a tool holding element mounted for rotation in said bore and means for locking a tool in said tool holding member with the cutting edge of said tool lying co-incident with the axis of said bore, and means for locking said tool holding member against rotation in said bore.

GEORGE R. SCOTT.